(12) United States Patent
Bae et al.

(10) Patent No.: US 8,576,739 B2
(45) Date of Patent: *Nov. 5, 2013

(54) APPARATUS AND METHOD FOR ESTIMATING CHANNEL CAPACITY OF END-TO-END TERMINAL

(75) Inventors: Seong-Jun Bae, Daejeon (KR); Jeong Ju Yoo, Daejeon (KR); Jin Woo Hong, Daejeon (KR); Sung Jea Ko, Daejeon (KR); Hye Soo Kim, Daejeon (KR); Hyung Min Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 278 days.

This patent is subject to a terminal disclaimer.

(21) Appl. No.: 13/120,326

(22) PCT Filed: Jul. 2, 2009

(86) PCT No.: PCT/KR2009/003614
§ 371 (c)(1),
(2), (4) Date: Mar. 22, 2011

(87) PCT Pub. No.: WO2010/035942
PCT Pub. Date: Apr. 1, 2010

(65) Prior Publication Data
US 2011/0170451 A1    Jul. 14, 2011

(30) Foreign Application Priority Data
Sep. 23, 2008  (KR) .................. 10-2008-0093225

(51) Int. Cl.
*H04J 1/16* (2006.01)
*H04J 3/16* (2006.01)

(52) U.S. Cl.
USPC ............................................ 370/252; 370/465

(58) Field of Classification Search
USPC .................. 370/252, 465, 235, 236
See application file for complete search history.

(56) References Cited

U.S. PATENT DOCUMENTS

| | | | |
|---|---|---|---|
| 6,813,244 B1 | 11/2004 | He et al. | |
| 7,012,894 B2 | 3/2006 | Belaiche | |
| 7,027,401 B1 * | 4/2006 | Ozegovic | ............ 370/236 |
| 7,133,368 B2 | 11/2006 | Zhang et al. | |
| 7,188,172 B2 | 3/2007 | Del Val et al. | |

(Continued)

FOREIGN PATENT DOCUMENTS

| | | |
|---|---|---|
| JP | 2001-112067 | 4/2001 |
| KR | 2002-0035955 | 5/2002 |

OTHER PUBLICATIONS

Office Action issued by the U.S. Patent and Trademark Office on Oct. 17, 2012 in U.S. Appl. No. 12/808,133.

(Continued)

*Primary Examiner* — Andrew Lee
(74) *Attorney, Agent, or Firm* — Staas & Halsey LLP

(57) ABSTRACT

Disclosed is an apparatus and method for estimating a channel capacity of an end-to-end terminal. The channel capacity estimating method of the end-to-end terminal includes calculating an average value of channel capacities for each size of data packets, the data packets varying in size, measuring an actual channel capacity with respect to the data packets, and deriving a linear model of a channel capacity based on the size of the data packets using the average value of the channel capacities and the actual channel capacity.

8 Claims, 7 Drawing Sheets

(56) References Cited

U.S. PATENT DOCUMENTS

| | | |
|---|---|---|
| 7,558,202 B2 | 7/2009 | Luo et al. |
| 7,804,805 B2 * | 9/2010 | Park et al. ............ 370/338 |
| 8,315,164 B2 * | 11/2012 | Rodbro et al. ............ 370/230 |
| 2002/0080727 A1 | 6/2002 | Kim et al. |
| 2004/0003107 A1 * | 1/2004 | Barham et al. ............ 709/235 |
| 2004/0052210 A1 * | 3/2004 | Kasera et al. ............ 370/235 |
| 2005/0118958 A1 | 6/2005 | Alexiou |
| 2007/0019599 A1 * | 1/2007 | Park et al. ............ 370/338 |
| 2007/0097257 A1 * | 5/2007 | El-Maleh et al. ............ 348/419.1 |
| 2010/0208732 A1 * | 8/2010 | Rodbro et al. ............ 370/390 |

OTHER PUBLICATIONS

Notice of Allowance issued by the U.S. Patent and Trademark Office on Mar. 7, 2013 in U.S. Appl. No. 12/808,133.

* cited by examiner

Fig. 1 if($L<2L_{min}$)
   BEING NOT DIVIDED
else if($L<2L_{max}$)
   | L/2 | L/2 |
else {
   if($L_R<2L_{min}$)
      | $L_{max}$ | $L_{max}$ | ..... | $L_{max}$ | $L_{max}$ | $L_R$ |
      PAIR OF PACKETS
   else if($L_R<2L_{max}$)
      | $L_{max}$ | $L_{max}$ | ..... | $L_{max}$ | $L_{max}$ | $L_R/2$ | $L_R/2$ |
      PAIR OF PACKETS      PAIR OF PACKETS
}

| L(BYTES) | f(L) | α |
|---|---|---|
| 600 | 2.6095 | -587.24 |
| 800 | 2.3963 | -667.82 |
| 1000 | 2.3065 | -814.15 |
| 1200 | 1.6413 | -474.81 |
| 1500 | 1.4117 | -372.62 |

| L(BYTES) | f(L) | α(DETERMINED) |
|---|---|---|
| 600 | 2.5428 | -575.774 |
| 800 | 2.249 | -575.774 |
| 1000 | 1.9919 | -575.774 |
| 1200 | 1.7958 | -575.774 |
| 1500 | 1.6704 | -575.774 |

APPARATUS AND METHOD FOR ESTIMATING CHANNEL CAPACITY OF END-TO-END TERMINAL

CROSS REFERENCE TO RELATED APPLICATIONS

This application claims the benefit of International Application No. PCT/KR2009/003614, filed Jul. 2, 2009, and claims the benefit of Korean Application No. 10-2008-0093225, filed Sep. 23, 2008, the disclosures of all of which are incorporated herein by reference.

TECHNICAL FIELD

The present invention relates to an apparatus and method for estimating a channel capacity of an end-to-end terminal, and more particularly, to an apparatus and method for estimating a channel capacity using a data packet.

BACKGROUND ART

A method for effectively using a channel during data communication between terminals is to estimate a current channel capacity, thereby minimizing loss of data packet, which is caused by exceeding the channel capacity. Therefore, the estimation with respect to the current channel capacity may be required to effectively use the channel.

According to a conventional channel capacity estimating method, a server end separately transmits additional probing packets that are different from data packets, and a client end receives and analyzes the probing packets, thereby estimating the channel capacity. The method has been used in a wired network that has relatively wider bandwidth than a wireless network. The described method is not appropriate in the wireless network where the channel capacity is small since the additional probing packets use the channel and decrease the channel capacity that is available to actual data packets.

Therefore, a method for effectively estimating a channel capacity in a wireless network where the channel capacity is small is required.

DISCLOSURE OF INVENTION

Technical Problem

An aspect of the present invention provides an apparatus and method for estimating a channel capacity of an end-to-end terminal that estimates the channel capacity using a data packet without using an additional packet, thereby effectively estimating the channel capacity in a wireless network where the channel capacity is small.

Technical Solution

According to an aspect of an example embodiment, there is provided an apparatus for estimating a channel capacity of an end-to-end terminal including a channel capacity averaging unit to calculate an average value of channel capacities for each size of data packets, the data packets varying in size, a linear modeling unit to derive a linear model of a channel capacity with respect to a data packet using the average value of the channel capacities, and a channel capacity estimating unit to estimate a channel capacity with respect to a certain data packet using the linear model.

According to another aspect of an exemplary embodiment, there is provided a method for estimating a channel capacity of an end-to-end terminal including calculating an average value of channel capacities for each size of data packets, the data packets varying in size, measuring a actual channel capacity with respect to the data packets, and deriving a linear model of a channel capacity based on the size of the data packets using the average value of the channel capacities and the actual channel capacity.

BRIEF DESCRIPTION OF DRAWINGS

FIG. 1 illustrates a packetization method according to an example embodiment of the present invention;

MODE FOR THE INVENTION

Figure 2:
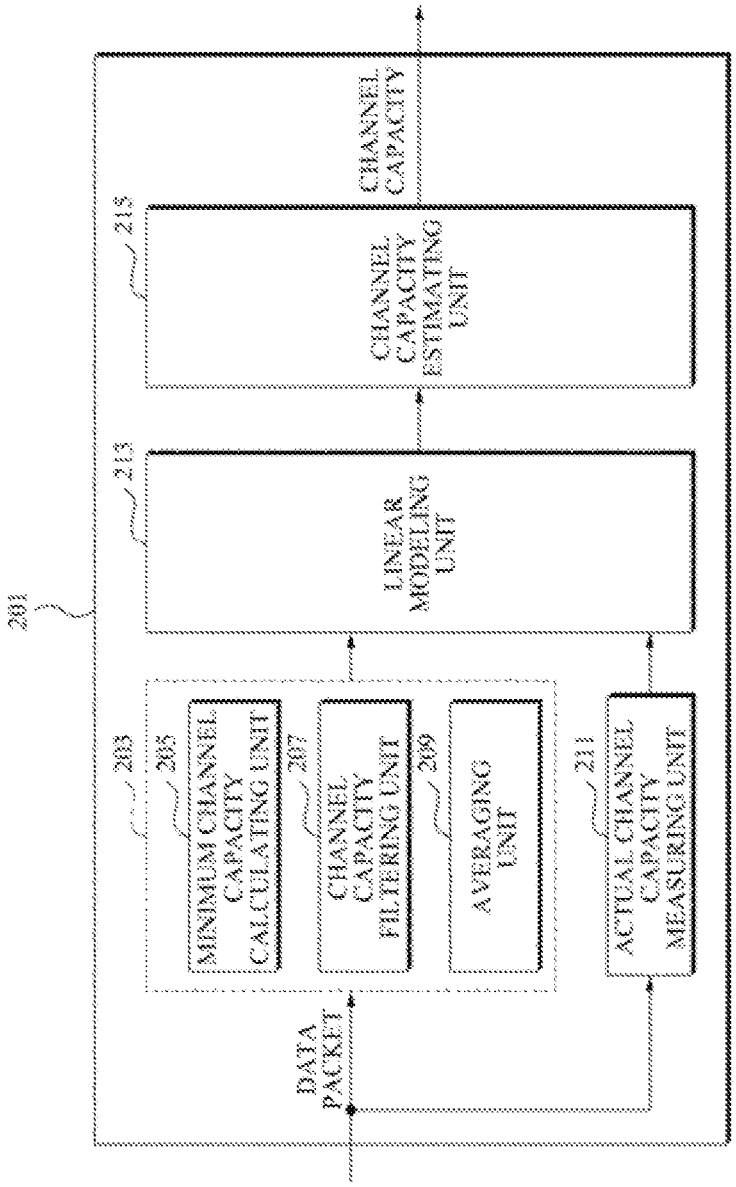
FIG. 2 is a block diagram illustrating a configuration of a channel estimating apparatus of an end-to-end terminal according to an example embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

When data transmission is performed between both terminals in a wired/wireless network where a method for estimating a channel capacity of an end-to-end terminal is applied according to example embodiments of the present invention, a server end generates data packets varying in size and segments the variously sized data packets into pairs having the same size data packets to transmit to a client end.

In this instance, the server end may perform a packetization, that is, segment and transmit a data packet in a Maximum Transmission Unit (MTU) to minimize relative overhead based on a size of the data packet during segmentation of the data packet and to maximize the channel capacity.

The client end may measure a difference in time between receiving pairs of data packets and then perform filtering, and thereby estimate the channel capacity. The client end may estimate the channel capacity based on a size of a data packet using channel capacities with respect to pairs of data packets varying in size, and may perform feedback of the estimated channel capacity to the server end.

Hereinafter, the packetization method in the server end will be described.

FIG. 1 illustrates a packetization method according to an example embodiment of the present invention.

Referring to FIG. 1, the server end may not perform the packetization when a size (L) of a generated packet is smaller than a predetermined value (2 Lmin). This is because estimating of a time difference using a pair of excessively small size packets may lead to inaccurate values.

The server end may generate a single pair of packets when the size (L) of the generated packet is greater than 2 Lmin and smaller than 2 Lmax. In this instance, the server end may generate a pair of packets having the same size. Accordingly, a size of each packet corresponding to the pair of the packets may be L/2.

Also, when the size of the packet is greater than 2 Lmax, the sever end may generate a plurality of packets in a size of Lmax. With respect to a remaining data packet portion (LR), the server end may generate a pair of packets based on a size.

That is, when the LR is smaller than 2 Lmin, the server end may not perform packetization and when the LR is greater than 2 Lmin and smaller than 2 Lmax, the server end may generate a single pair of packets. In this instance, the server end may generate several pairs of the same size packets. Accordingly, a size of each packet corresponding to the pair of the packets may be LR/2.

Here, the Lmax is MTU, and may be 1500 bytes in a general IP network.

For estimating the channel capacity, both of pairs of packets in a MTU size generated through the described method and pairs of the same size packets even though being smaller than the MTU are used.

Hereinafter, an apparatus and a method for estimating a channel of an end-to-end terminal according to example embodiment of the present invention will be described in detail. Here, the apparatus and method for estimating the channel of an end-to-end terminal may be performed in the client end.

FIG. 2 is a block diagram illustrating a configuration of a channel estimating apparatus of an end-to-end terminal according to an example embodiment of the present invention.

Referring to FIG. 2, the channel estimating apparatus of the end-to-end terminal 201 includes a channel capacity averaging unit 203, actual channel capacity measuring unit 211, linear modeling unit 213, and channel capacity estimating unit 215.

The channel capacity averaging unit 203 calculates an average value of channel capacities for each size of data packets, the data packets varying in size. The channel capacity averaging unit 203 includes a minimum channel capacity calculating unit 205, a channel capacity filtering unit 207, and averaging unit 209.

The minimum channel capacity calculating unit 205 calculates a smallest channel capacity
$C_{min}^i$
from among a plurality of sections between the server end and client end using a packet pair probing technique.

Figure 3:
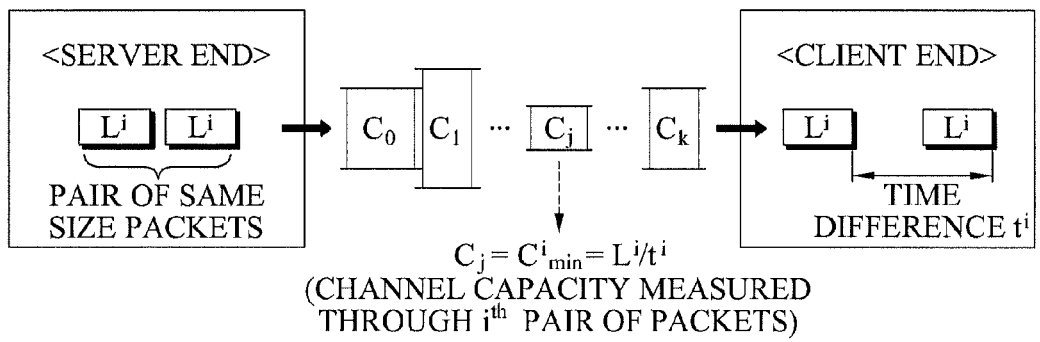
FIG. 3 illustrates a method for estimating a channel capacity between a server end and a client end.

That is, as illustrated in FIG. 3, the minimum channel capacity calculating unit 205 may calculate the smallest channel capacity
$C_{min}^i$
from among the k channel capacities using a size
$L^i$
of a data packet and a time difference
$t^i$
between a pair of the data packets when k sections respectively having $C_0, \ldots,$ and $C_k$ between the server end and client end exist, and it is expressed by Equation 1 below.

$$C_{min}^i = L^i / t^i \qquad \text{[Equation 1]}$$

Here,
$L^i$
represents a length of one packet of a received pair of packets.

Also, it is assumed that a pair of data packets is transmitted without an interval between the pair of data packets from the server end to the client end.

The channel capacity filtering unit 207 eliminates a minimum channel capacity exceeding a maximum throughput through filtering calculated minimum channel capacities with respect to respective pairs of data packets. Here, the maximum throughput is a theoretical maximum data throughput per second between the server end and the client end, and for example, it may be 1.8 Mbps in a High Speed Downlink Packet Access (HSDPA) network.

Accordingly, the channel capacity filtering unit 207 may eliminates the minimum channel capacity exceeding 1.8 Mbps through filtering and a channel capacity after the filtering may be expressed by Equation 2.

$$\hat{C}^i = \begin{cases} C_{min}^i, & C_{min}^i < 1.8 \text{ Mbps} \\ 0, & C_{min}^i \geq 1.8 \text{ Mbps} \end{cases} \qquad \text{[Equation 2]}$$

Here, i represents a number of a pair of packets.

The averaging unit 209 calculates an average value with respect to the channel capacity values obtained after filtering. That is, if it is assumed that a number of channel capacities obtained after filtering is K and an average value of the K channel capacities is A when N pairs of packets are received, the averaging unit 209 may calculate the average value A according to Equation 3.

$$A = \frac{1}{K} \sum_{i=1}^{K} \hat{C}^i \qquad \text{[Equation 3]}$$

The actual channel capacity measuring unit 211 measures an actual channel capacity with respect to pairs of data packets. Here, when data exceeding a maximum channel capacity is transmitted, the actual channel capacity measuring unit 211 measures received throughput so as to measure the actual channel capacity, however, example embodiments are not limited thereto.

The linear modeling unit 213 derives a linear model of a channel capacity for each size of data packets with respect to an average value of channel capacities for data packets and the actual channel capacity.

Figure 4:
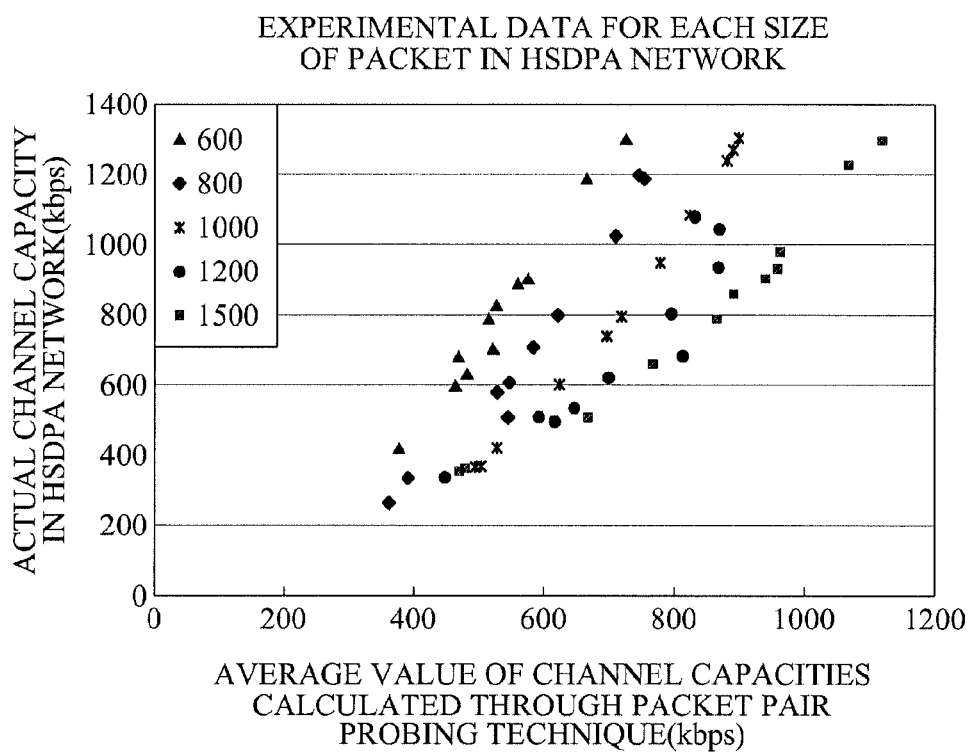
FIGS. 4 and 5 illustrate an average value of channel capacities with respect to pairs of data packets and an actual channel capacity.

Particularly, the linear modeling unit 213 may illustrate the average value of the channel capacities with respect to pairs of data packets and actual capacity as illustrated in FIG. 4.

FIG. 4 illustrates measuring of a channel capacity through a packet pair probing technique based on a size of a packet. A horizontal axis represents an average value A with respect to channel capacity values obtained after filtering and a vertical axis represents an actual channel capacity in an HSDPA network. Also, a certain value on a drawing FIG. 4, a single experimental value, may be a plurality of data packets with the same size.

Referring to FIG. 4, it is recognized that the channel capacity estimated through the packet pair probing technique is different depending on the size of a transmitted data packet, even though a maximum throughput per second is the same.

Figures 5, 6:
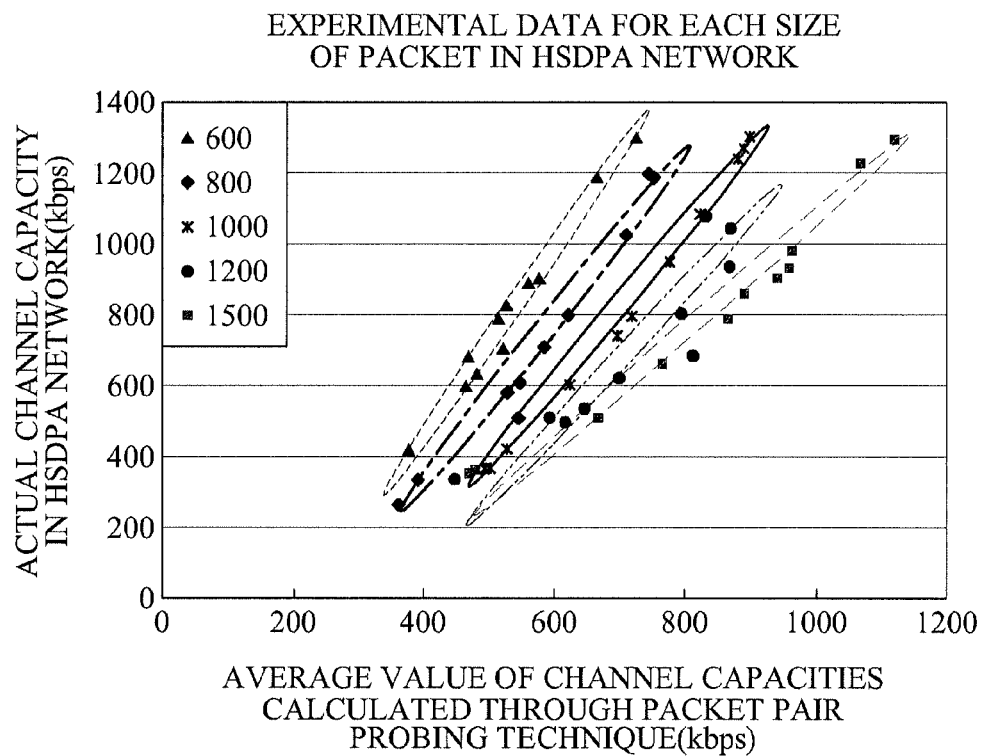
FIG. 6 illustrates
$f(L)$
and
$\alpha$
of a linear model for each size of data packets with respect to FIG. 5.

The linear modeling unit 213 may derive a general linear model of the channel capacity based on FIG. 5. Here, FIG. 5 illustrates that the channel capacity estimated through the packet pair probing technique of FIG. 4 is linear according to the size of the data packet.

Also, the general linear model may be expressed by Equation 4 below.

$$E = f(L) \times A + \alpha \quad \text{[Equation 4]}$$

Here, L represents a size of a data packet, $f(L)$ represents a function with respect to L. Also, $\alpha$ represents a channel capacity when an average value of channel capacities does not exist. The $f(L)$ and $\alpha$ may be obtained through experiments.

Figure 7:
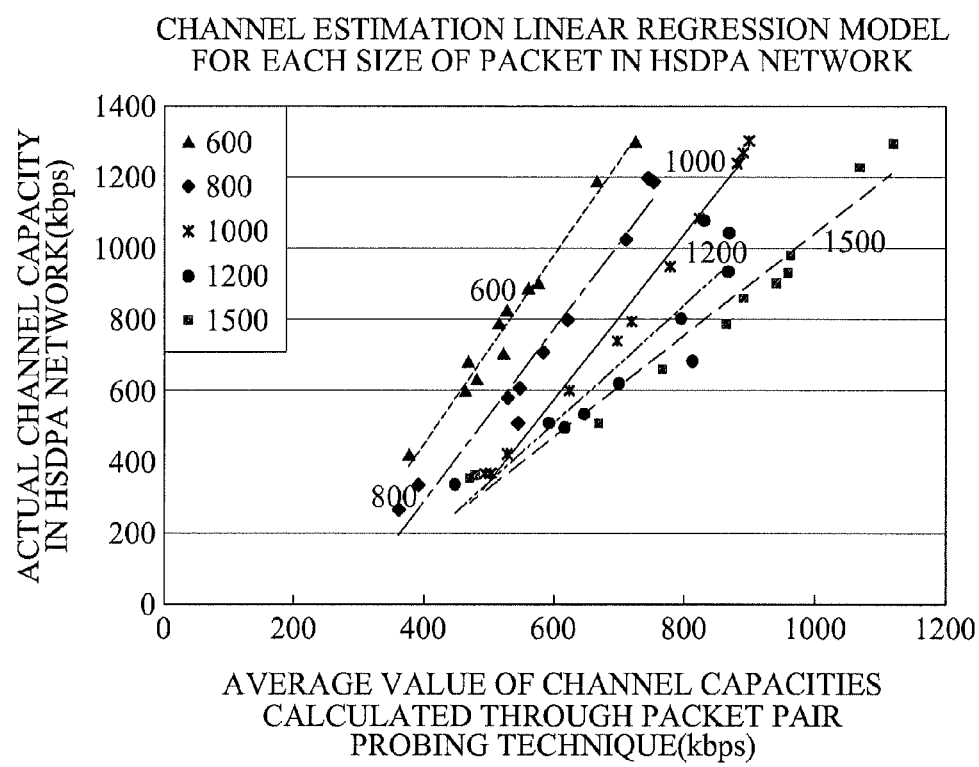
FIG. 7 illustrates a linear model for each size of data packets with respect to FIG. 5.

The linear modeling unit 213 may derive the linear model of Equation 4 based on a size of each data packet with respect to FIGS. 4 and 5. The $f(L)$ and $\alpha$ determined in the linear modeling unit 213 may be the same as FIG. 6 and a linear model obtained through applying the determined $f(L)$ and $\alpha$ to Equation 5 may be the same as FIG. 7.

To obtain a single linear model for estimating a channel capacity, the linear modeling unit 213 may perform modeling the $f(L)$ as a cubic regression equation like Equation 5, a variable of which is the size of the packet.

$$f(L) = k_1 \cdot \left(\frac{8 \cdot L}{1024}\right)^3 + k_2 \cdot \left(\frac{8 \cdot L}{1024}\right)^2 + k_3 \cdot \left(\frac{8 \cdot L}{1024}\right) + k_4 \quad \text{[Equation 5]}$$

Figures 8, 9:
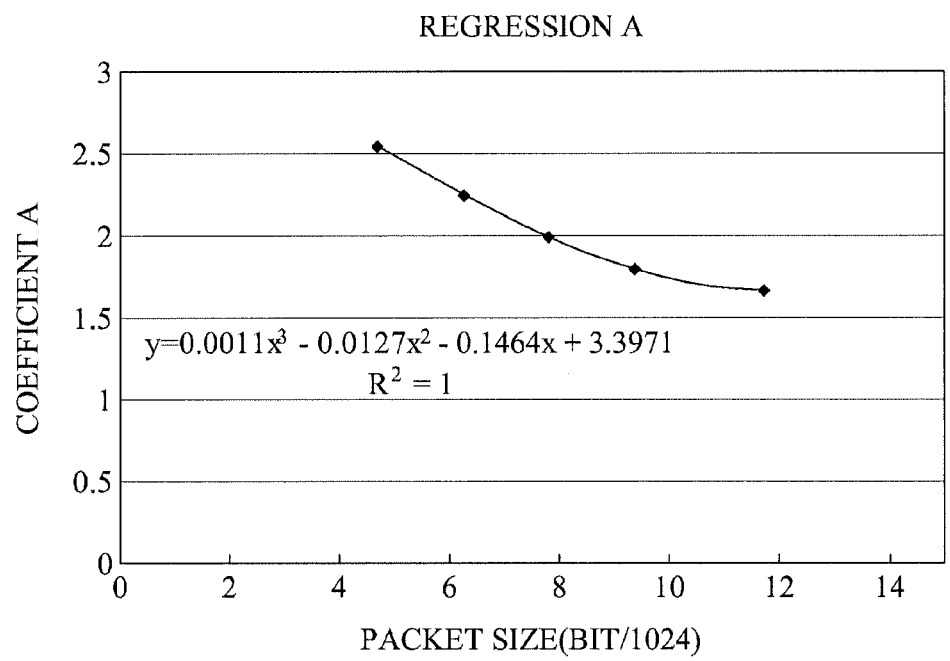
FIG. 8 illustrates modeled
$f(L)$
when
$\alpha$
is determined.
FIG. 9 illustrates
$f(L)$
for each data packet when
$\alpha$
is determined.

The linear modeling unit 213 may formulate $f(L)$ in which the $\alpha$ is predetermined as a constant, through Equation 6, and a graph of $f(L)$ modeled as the cubic regression equation is as illustrated in FIG. 8.

$$f(L) = 0.0011 \cdot \left(\frac{8 \cdot L}{1024}\right)^3 - 0.0127 \cdot \left(\frac{8 \cdot L}{1024}\right)^2 - 0.1464 \cdot \left(\frac{8 \cdot L}{1024}\right) + 3.3971 \quad \text{[Equation 6]}$$

Accordingly, when the $\alpha$ is −575,774, the $f(L)$ for each size of data packets using Equation 6 is as illustrated in FIG. 9.

The linear modeling unit 213 substitutes the determined constant $\alpha$ and the $f(L)$ having the determined constant $\alpha$ to Equation 4 and derives a final linear model that may estimate a channel capacity according to a size of a data packet, through Equation 7.

$$E = \left(0.0011 \cdot \left(\frac{8 \cdot L}{1024}\right)^3 - 0.0127 \cdot \left(\frac{8 \cdot L}{1024}\right)^2 - 0.1464 \cdot \left(\frac{8 \cdot L}{1024}\right) + 3.3971\right) \times A - 575.774 \ (Kbps) \quad \text{[Equation 7]}$$

The channel capacity estimating unit 215 may estimate the channel capacity according to the size of the data packet using the final linear model. That is, the channel capacity estimating unit 215 may substitute a size L of a certain data packet and an average value A of channel capacities to Equation 7 to estimate a channel capacity E with respect to the data packet.

Figure 10:
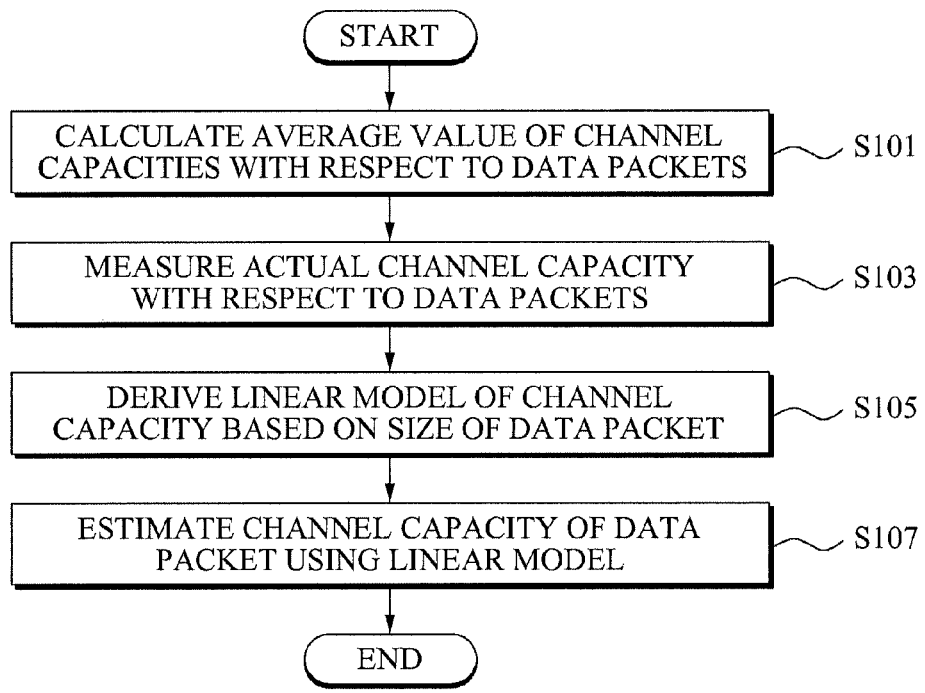
FIG. 10 is a flowchart illustrating a method for estimating a channel of an end-to-end terminal according to example embodiment of the present invention.

FIG. 10 is a flowchart illustrating a method for estimating a channel of an end-to-end terminal according to example embodiment of the present invention.

Referring to FIG. 10, a channel capacity estimating apparatus may calculate an average value of channel capacities with respect to data packets in operation S101.

The channel estimating apparatus may calculate the average value for each size of the data packets with respect to the data packets varying in size.

Particularly, with respect to pairs of data packets, the channel estimating apparatus respectively calculates a minimum channel capacity from among various channel capacities in a plurality of sections through Equation 1, and eliminates a minimum channel capacity exceeding a maximum throughput from among the minimum channel capacities through Equation 2. Subsequently, the channel estimating apparatus calculates an average value of channel capacities obtained after filtering, through Equation 3.

Next, the channel estimating apparatus measures an actual channel capacity with respect to the data packets in operation S103.

With respect to the data packets varying in size, the channel estimating apparatus measures the actual channel capacity for each size of the data packets.

Next, the channel estimating apparatus derives a linear model of a channel capacity based on a size of a data packet in operation S105.

Specifically, the channel estimating apparatus derives the linear model of the channel capacity for each size of the data packets using the average value of the channel capacities and actual channel capacity with respect to the pairs of data packets.

Next, the channel estimating apparatus derives a general linear model illustrated in Equation 4 and also calculates $f(L)$ and
$\alpha$
of the general linear model.

That is, the channel estimating apparatus performs modeling of the
$f(L)$
as a cubic regression equation like Equation 5 and calculates
$f(L)$
of when the
$\alpha$
is determined as a constant. Here, the
$f(L)$
of when the
$\alpha$
is determined as the constant is expressed as Equation 6.

Next, the channel estimating apparatus substitutes the determined constant
$\alpha$
and the
$f(L)$
of when the
$\alpha$
is determined as the constant to the general linear model, namely Equation 4, and derives a final linear model that may estimate a channel capacity according to a size of a data packet. In this instance, the final linear model may be expressed as Equation 7.

Next, the channel estimating apparatus substitutes a size of a certain data packet and an average value of channel capacities to the final linear model to estimate the channel capacity of the data packet in operation S107.

According to the present invention, there is provided an apparatus and method for estimating a channel capacity of an end-to-end terminal that estimates a channel capacity using a data packet without using an additional packet, thereby effectively estimating the channel capacity in a wireless network where the channel capacity is small.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for estimating a channel capacity, the method comprising:
   calculating an average value of channel capacities for each size of data packets, the data packets varying in size;
   measuring an actual channel capacity with respect to the data packets; and
   deriving a linear model of a channel capacity based on the size of the data packets using the average value of the channel capacities and the actual channel capacity,
   wherein the calculating, measuring, and deriving are performed by one or more processors.

2. The method of claim 1, wherein the one or more processors further perform:
   estimating a channel capacity with respect to a certain data packet using the linear model.

3. The method of claim 1, wherein the calculating of the average value comprises:
   calculating a minimum channel capacity with respect to each of the data packets;
   filtering the minimum channel capacities using a maximum data throughput; and
   calculating an average value of minimum channel capacities remaining after the filtering.

4. The method of claim 3, wherein the calculating of the minimum channel capacity calculates the minimum channel capacity through dividing a size of one data packet of a pair of data packets by a difference in time between receiving packets of the pair of data packets.

5. The method of claim 1, wherein the deriving of the linear model of the channel capacity comprises:
   modeling a function of the size of the data packets included in the linear model as a regression equation;
   determining the function of the size of the data packet after determining a channel capacity of when the average value of the channel capacities does not exist in the linear model; and
   substituting the determined channel capacity and the determined function of the size of the data packet into the linear model to derive a final linear model.

6. An apparatus for estimating a channel capacity, the apparatus comprising:
   a channel capacity averaging unit to calculate an average value of channel capacities for each size of data packets, the data packets varying in size;
   a linear modeling unit to derive a linear model of a channel capacity with respect to a data packet using the average value of the channel capacities; and
   a channel capacity estimating unit to estimate a channel capacity with respect to a certain data packet using the linear model.

7. The apparatus of claim 6, wherein the linear modeling unit derives the linear model of the channel capacity based on a size of the data packets using the average value of the channel capacities and actual channel capacity with respect to the data packets.

8. The apparatus of claim 6, wherein the channel capacity estimating unit substitutes a size of the certain data packets into the linear model to estimate the channel capacity with respect to the certain data packet.

* * * * *